United States Patent [19]

Matui

[11] 4,188,727
[45] Feb. 19, 1980

[54] CONSTANT PRESSURE SLIDE CALIPERS FOR INSIDE-OUTSIDE MEASUREMENTS

[75] Inventor: Yukito Matui, Utsunomiya, Japan

[73] Assignee: Kabushiki Kaisha Mitutoyo Seisakusho, Tokyo, Japan

[21] Appl. No.: 917,885

[22] Filed: Jun. 22, 1978

[30] Foreign Application Priority Data

Jun. 30, 1977 [JP] Japan ............................ 52/86558[U]

[51] Int. Cl.² .............................................. G01B 03/20
[52] U.S. Cl. ................................. 33/147 T; 33/147 J
[58] Field of Search ............ 33/143 M, 143 J, 143 K, 33/147 T, 147 J, 147 H, 147 K

[56] References Cited

U.S. PATENT DOCUMENTS

| 425,208 | 4/1890 | Carlyle | 33/147 J |
| 3,104,470 | 9/1963 | Plante | 33/147 J |
| 3,327,397 | 6/1967 | Mangano | 33/147 J |
| 4,063,362 | 12/1977 | Amsbury et al. | 33/147 J |

FOREIGN PATENT DOCUMENTS

| 1210574 | 2/1966 | Fed. Rep. of Germany | 33/147 J |
| 437824 | 11/1967 | Switzerland | 33/147 K |

*Primary Examiner*—Richard R. Stearns
*Attorney, Agent, or Firm*—Brisebois & Kruger

[57] ABSTRACT

The present invention is characterized in that a measuring jaw is constituted as a separate entity from a main beam; this jaw is axial-slidably supported on the main beam; and said jaw can be urged by a spring force in a selectable direction so that the inside and outside measurements can be done at a constant pressure with no error.

5 Claims, 6 Drawing Figures

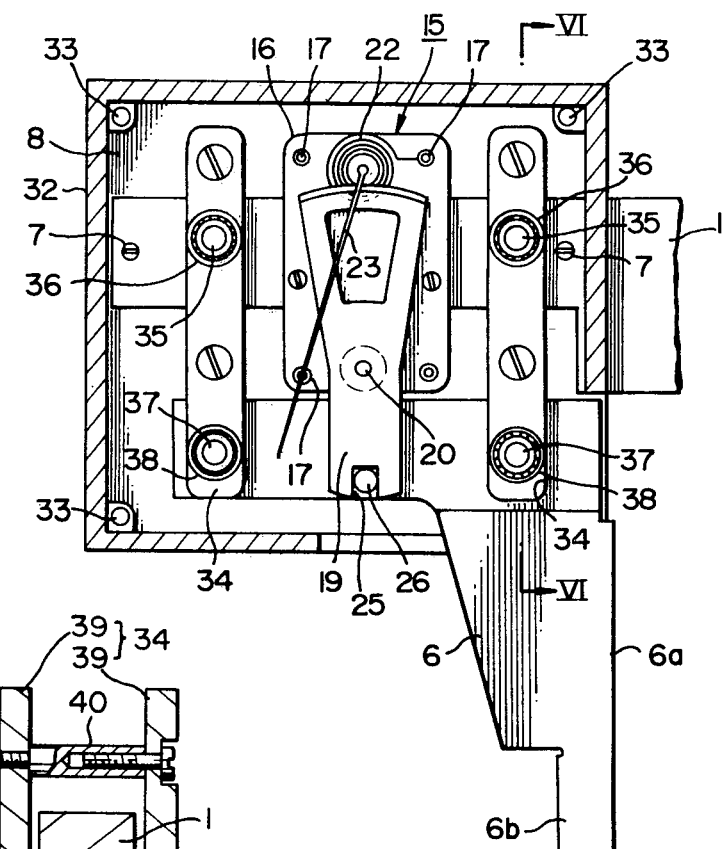
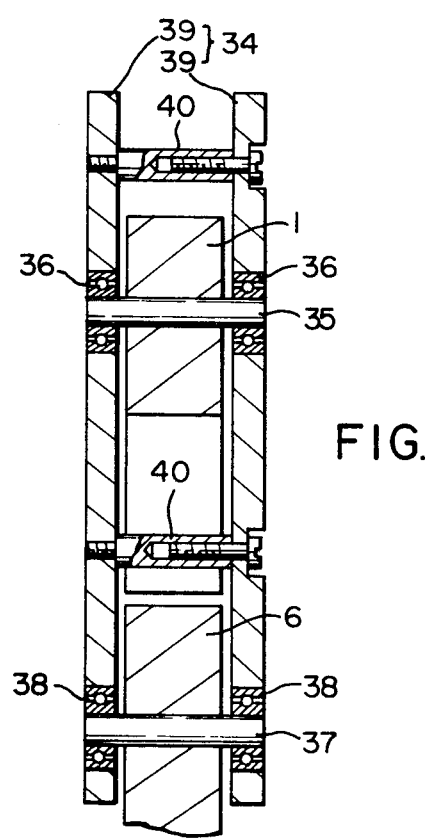
FIG. 5
FIG. 6

CONSTANT PRESSURE SLIDE CALIPERS FOR INSIDE-OUTSIDE MEASUREMENTS

BACKGROUND OF THE INVENTION

The present invention relates to a slide calipers which can make the inside and outside measurements of an object at a constant measuring pressure.

In the prior art there is a constant pressure slide calipers in which a measuring jaw is separated from a main beam; the measuring jaw and the main beam are joined by a pair of parallel leaf springs; the measuring jaw is thus slidable along the main beam; and the displacement of the measuring jaw is transmitted as enlarged to a pointer, which indicates the measuring pressure. In this slide calipers, however, the pointer and the leaf springs are set in the optimum relation for outside measurement, which is not suited to inside measurement; besides, it is impossible to set an arbitrary value of the measuring pressure, i.e., the spring pressure (U.S. Pat. No. 3,104,470).

SUMMARY OF THE INVENTION

The primary object of the present invention is to provide a slide calipers which is available for both inside and outside measurements, the measuring pressure being adjustable to suit the material quality of an article to be measured and a spring force being given to the measuring jaw by a linear spring rotatably held on the main beam.

Another object of the present invention is to provide a slide calipers in which the measuring jaw-urging direction of the spring force can be readily changed by a simple mechanism.

The other objects and features of the present invention will become apparent from the following account referring to the attached drawings.

BRIEF DESCRIPTION OF THE ATTACHED DRAWINGS

FIG. 5 is an enlarged sectional view of a detail in a slide calipers as another embodiment of the present invention.

FIG. 6 is a sectional view along VI—VI line of FIG. 5.

Figure 2:
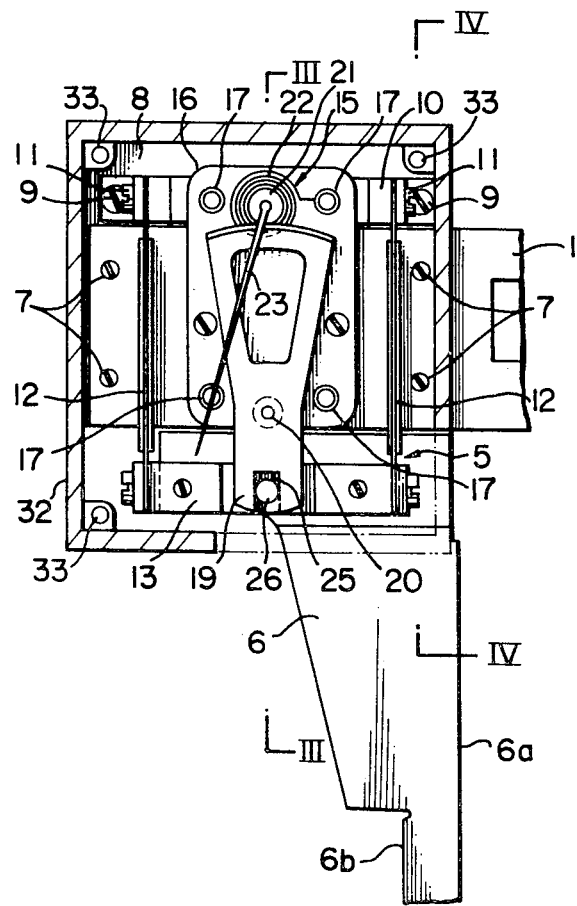
FIG. 2 is an enlarged sectional view of the fixture of the measuring jaw to the main beam in the slide calipers shown in FIG. 1.
Figure 3:
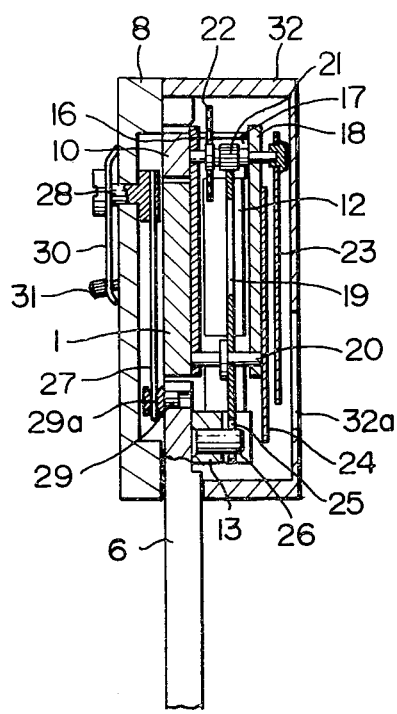
FIG. 3 is a sectional view along III—III line of FIG. 2.

In FIGS. 2 and 5, the base plate 18 shown in FIG. 3 is omitted.

DETAILED DESCRIPTION OF THE INVENTION

Figure 1:
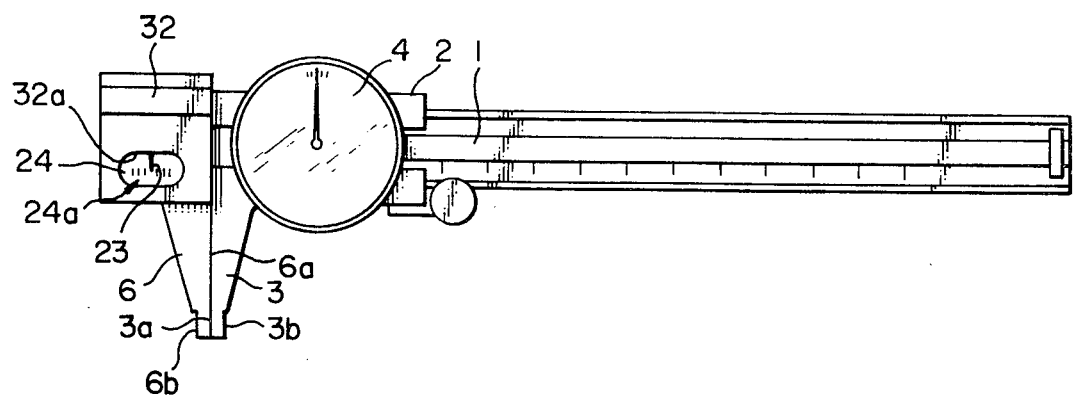
FIG. 1 is a plan view of a slide calipers according to the present invention.

In FIGS. 1 and 2, 1 is a main beam of a slide calipers; 2 is a vernier slidably attached to the main beam 1; 3 is a measuring jaw for the vernier integrated with the vernier 2; and 4 is a dial display indicating a displacement of the vernier 2.

At one end of the main beam 1, a measuring jaw 6 for the main beam is attached by means of the jaw fixture 5 (FIG. 2).

Next said measuring jaw fixture 5 and the attached state of the measuring jaw 6 are to be described. The measuring jaw fixture 5 consists of a body 8 (FIGS. 2-4) fixed to the tip of the main beam 1 by means of a stop screw 7 (FIG. 2); the spring-holder 10 fixed to said body 8 by means of a stop screw 9; a pair of leaf springs 12,12 arranged parallel with a specific spacing and supported at one end by said spring-holder 10 through the stop screws 11,11; and the parallel holder 13 provided at the other end of said leaf springs 12,12 to hold these springs in parallel, the measuring jaw 6 for the main beam being fitted to said parallel holder 13.

15 is a measuring pressure indicator fitted to the tip of the main beam 1. Said measuring pressure indicator 15 comprises a base plate 16 fitted to the main beam 1; a prop 17 attached to said base plate 16; the base plate 18 (FIG. 3) attached to said prop 17; a sector gear 19 interposed between said base plates 16,18; a pivotal shaft 20 rotatably supporting said sector gear 19 on said base plate 16,18; a pinion 21 meshing with said sector gear 19 and rotatably held between said base plates 16,18; the backlash-eliminating hair spring 22 with its outer end fitted to said base plate 16 and its inner end fitted to the axis of said pinion 21; a pointer 23 attached to the axis of said pinion 21; and a dial plate 24 (FIGS. 1, 3) fitted to said base plate 18. A recess 25 formed at one end of said sector gear 19 receives a pin 26 jutting from said parallel holder 13.

In FIG. 3, 27 is a linear spring to give a measuring pressure to the measuring jaw 6 for the main beam, its base being fitted to a spring-holding shaft 28 rotatably supported by the body 8 and its free end slidably fitting into a hold 29a of a spring-holder 29 attached to the measuring jaw 6 for the main beam. Said hole 29a is centrally throttled and the free end of said linear spring 27 contacts this throttled portion, whereby the free end of said spring 27 can smoothly slide in said hole 29a. An arm 30 is integrated with the outer end of the spring holding shaft 28 and at the tip of said arm 30 is provided a stop screw 31 to fix said arm 30 to the body 8.

Figure 4:
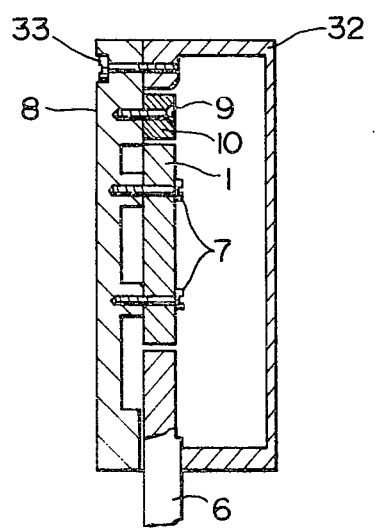
FIG. 4 is a sectional view along IV—IV line of FIG. 2.

32 is a cover for the measuring jaw fixture 5 and the measuring pressure indicator 15 and as indicated in FIGS. 2 and 4 said cover is fixed to the body 8 by means of the stop screw 33. 32a is a window provided in said cover 32 and as indicated in FIG. 1 this window faces the scale 24a on the dial plate 24. In FIG. 1, 3a is the outside measuring plane of the measuring jaw 3 for the vernier; 3b is the inside measuring plane formed at the tip of the measuring jaw 3 for the vernier; 6a is the outside measuring plane of the measuring jaw 6 for the main beam; and 6b is the inside measuring plane formed at the tip of the measuring jaw 6 for the main beam, both planes being parallel to each other.

In such a slide calipers as described above, it is so designed that when the measuring planes 3a,6a of the measuring jaws 3,6 are joined together and the pointer 23 is brought to the mid-position of the scale 24a, the dial indicator 4 reads zero. Next the use of this slide calipers is to be described.

When an outside measurement is to be made by means of this slide calipers, in FIG. 3 you pull the arm 30 toward you after loosening the stop screw 31 and then turn the lower end of the linear spring 27 toward you and around the spring-holding shaft 28. Thereupon the measuring jaw 6 is displaced rightward in FIG. 1 and the pointer 23 turns clockwise in FIG. 2 (to the left side of the scale 24a in FIG. 1). Then you tighten the stop screw 31 to fix the arm 30 to the body 8. In this state an article to be measured is clamped between the measuring jaws 3 and 6 and the vernier 2 is pressed against said article, thereby pushing the measuring jaw 6 toward the left in FIG. 1. Then the measuring jaw 6 will move to the left in FIG. 1, overcoming the force to said linear spring 27. Thereby the sector gear 19 turns clockwise around the pivotal axis 20 in FIG. 2 to cause the pointer 23 to turn counterclockwise together with the pinion 21. The reading of the dial indicator 4 given when the pointer 23 comes to the mid-position of the scale 24a of FIG. 1 will be the outside measured value of the article.

When an inside measurement is to be made using this slide calipers, in FIG. 3 you displace the arm 30 away from you after loosening the stop screw 31 and then turn the lower end of the linear spring 27 away from you around the spring-holding shaft 28. Thus the measuring jaw 6 for the main beam is moved to the left in FIG. 1 and the pointer 23 turns counterclockwise in FIG. 2 (to the right side of scale 24 a in FIG. 1). After that, you tighten the stop screw 31 to fix the arm 30 to the body 8. In this state with the tips of the measuring jaws 3,6 thrust into a hole to be measured, the measuring planes 3b,6b of the measuring jaws 3,6 are pressed against the wall of the hole overcoming the force of the linear spring 27, thereby moving the pointer 23 to the midposition of scale 24a in FIG. 1. Then the reading of the dial indicator 4 minus the distance between the measuring planes 3b and 6b when the measuring jaws 3,6 comes together will give the inner diameter of the hole.

In these cases, the force of the linear spring 27 minus the forces of the leaf springs 12,12 will give the measuring pressure and this pressure can be set at an arbitrary value depending on the turning of the linear spring 27 around the spring-holding shaft 28.

In the above examples, the measuring jaw 6 is attached to the tip of the main beam by means of a pair of leaf springs 12,12 so that the measuring jaw 6 can be displaced in the longitudinal direction of the main beam 1. However, the means to attach the measuring jaw 6 to the main beam is not necessarily the leaf springs 12,12; as illustrated in FIGS. 5 and 6, a pair of parallel links 34,34 may at one end be pivoted to the tip of the main beam 1 by means of the axis 35 and the bearing 36 and the other ends of said links 34,34 may be pivoted to the measuring jaw 6 by means of the axis 37 and the bearing 38. In that case the measuring jaw 6 will be able to slide in the longitudinal direction of the main beam 1. Said links 34,34, as shown in FIG. 6, represent a pair of plates 39,39 coupled together by the props 40,40.

In the present invention which is constituted as described above such that a linear spring movably attached to the main beam gives a spring force to the measuring jaw for the main beam, both the inside and the outside measurements can be made and the measuring pressure can be adjusted to suit the material quality of an object to be measured.

What is claimed is:

1. Constant pressure slide calipers for inside-outside measurements, comprising:
   a main beam;
   a vernier having a first measuring jaw and slidable along said main beam;
   a dial display attached to said vernier and indicating displacement of said vernier;
   a second measuring jaw,
   means mounting the second jaw for movement longitudinally of said main beam,
   spring means for urging said second jaw in either direction longitudinally of said beam,
   selector means for selecting the direction said second jaw is urged by said spring means,
   and indicator means for indicating the measuring pressure applied to said second jaw during a measurement.

2. Slide calipers of claim 1 wherein said indicator means comprises:
   a sector gear connected to said second measuring jaw of the main beam;
   a pinion meshed with said sector gear;
   a pointer attached to said pinion and indicating the measuring pressure applied to the said second measuring jaw on a dial plate.

3. Slide calipers of claim 1 wherein said spring means comprises, a linear spring connected to a rotatable element connected to the main beam, said spring having a free end slidably connected to said second jaw, and
   said selector means comprises, means for rotating said rotatable element in either direction.

4. Slide calipers of claims 1, 2 or 3, in which said means mounting said second measuring jaw for movement longitudinally of said main beam comprises a pair of parallel leaf springs.

5. Slide calipers of claims 1, 2 or 3, in which said means mounting said second measuring jaw for movement longitudinally of the main beam comprises a pair of parallel links.

* * * * *